(No Model.) 2 Sheets—Sheet 1.
J. STEEL.
CONDUIT.
No. 381,653. Patented Apr. 24, 1888.
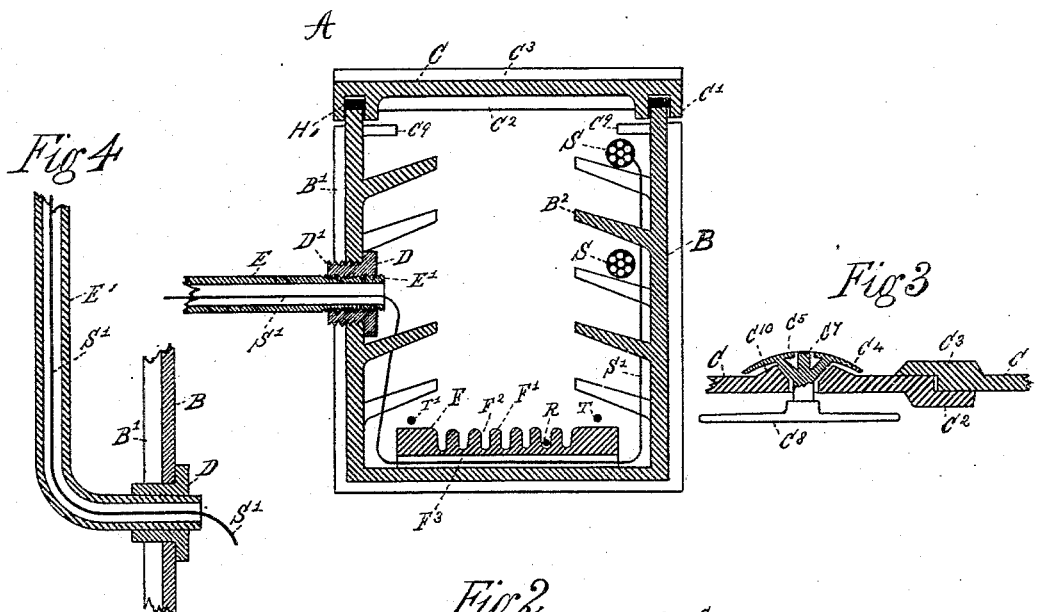
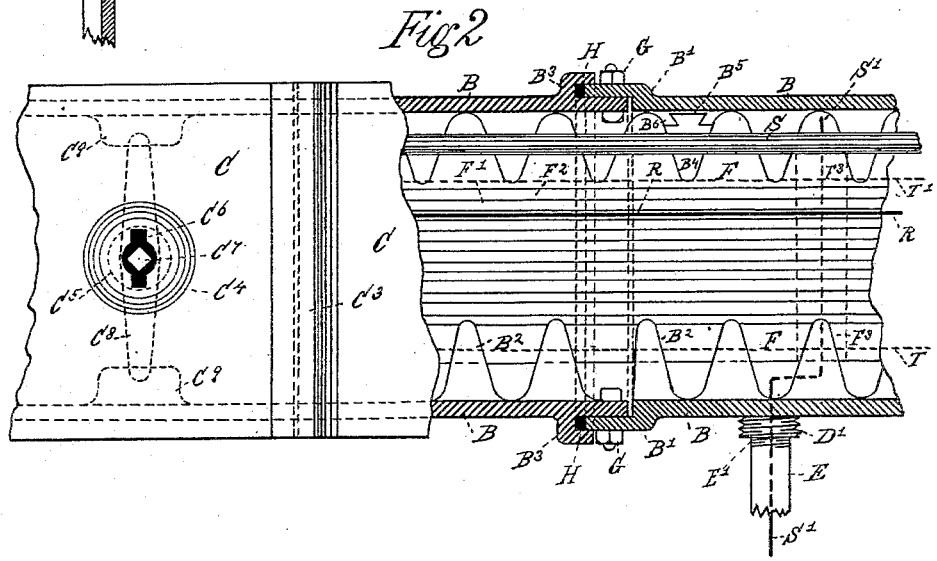
Witnesses
Richard A. Heffy.
George D. Hopper Jr.
Inventor
James Steel.
John Inglis atty.

(No Model.) 2 Sheets—Sheet 2.
J. STEEL.
CONDUIT.
No. 381,653. Patented Apr. 24, 1888.
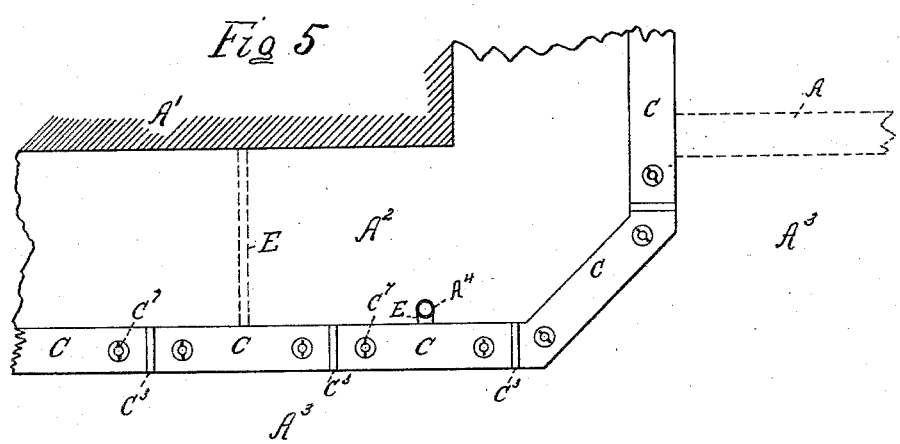

UNITED STATES PATENT OFFICE.

JAMES STEEL, OF PATERSON, NEW JERSEY.

CONDUIT.

SPECIFICATION forming part of Letters Patent No. 381,653, dated April 24, 1888.

Application filed April 30, 1885. Renewed September 1, 1887. Serial No. 248,577. (No model.)

*To all whom it may concern:*

Be it known that I, JAMES STEEL, a citizen of the United States, residing at Paterson, Passaic county, State of New Jersey, have invented a new and useful Improvement in Conduits for Electrical Conductors, of which the following is a specification, reference being had to the accompanying drawings, forming a part thereof.

The object of my invention is to provide a conduit for electrical conductors of new construction, wherein the electrical conductors, cables, &c., may be arranged, secured, repaired, and introduced into buildings, &c., with facility and cheapness. I attain these objects by the construction shown, which will be fully explained, and pointed out in the claim.

Figure 1 of the drawings is a sectional elevation of the conduit, showing its general arrangement of parts. Fig. 2 is a part-sectional plan of the same. Fig. 3 is a part-longitudinal section of the top of the conduit. Fig. 4 is a part section of conduit for awning, electric-light posts, &c. Fig. 5 is a part plan of street having my invention laid therein.

A represents a conduit for electrical conductors, made of cast metal or other suitable material or materials and made in sections. The different sections forming the sides of the conduit are provided with projecting flanges B' and B³, that overlap each other, and which are secured together by means of bolts G, as shown in Fig. 2.

At the end of the overlapping flange B', under the overlapping flange B³, there are arranged rubber packing-strips H, which elastic strips admit of the expansion and contraction of the parts under the differences of temperature and serve the purpose of keeping the joints water-tight. The interior of the conduit, which is provided with sloping arms or brackets B², will be insulated by some suitable insulating substance over its entire inner surface. The arms or brackets B², which are integral with the sides of the conduit A, can and may be constructed separate from the same, and be secured thereto by means of dovetail, as shown at B⁴, B⁵, and B⁶, Fig. 2. The top or cover C of the conduit A is provided with depending lugs C', which lugs pass down over the inner and outer portions or surfaces of the sides of the conduit, at the top of the same, which construction firmly locks the sides in position, whereby the sides of the conduit are held in the event of lateral strain or pressure.

Between the inner and outer lugs C' there are arranged elastic packing-strips H', as shown in Fig. 1.

In the interior of the conduit, and near the bottom of the same, is arranged a supporting frame or grating, F, having a series of bars, F', which forms a series of openings, F², to accommodate electrical conductors R, which conductors may be used as telephone, telegraph, or electric-light conductors. When arranged in the openings or spaces F² the conductors R rest on and are supported vertically by the cross bars of the grating, the spaces being entirely open under the conductors between the cross-bars, which are placed at suitable distances apart to give ample support to the conductors, which may be taken down through between the bars F' under the supporting-frame at any desired point where connections are to be made, and may be taken out through the tube E, and from thence to their destination, the supporting-frame being sufficiently elevated above the bottom of the conduit to form the spaces F³.

At suitable points along the line of the conduit, and in the sides of the same, is arranged a connecting-joint, D. The said joint is screwed in the side of the conduit until the flange thereof jams against the inside of the same. The orifice of the connecting-joint is provided with a screw-thread to accommodate a corresponding thread, E', cut on the outer surface of the tube E, which adapts the said tube to screw in the connecting-joint D, as shown in Fig. 1.

The cover C of the conduit A at suitable points has openings formed therein to accommodate a shaft, C⁷, which shaft has integral with it drips C⁴. The drips C⁴ are suitably curved and cover raised portions C¹⁰, formed on the cover of the conduit around the said openings therein. The lower end of the shaft C⁷ is provided with an arm, C⁸, which arm is arranged to engage lugs C⁹, arranged on the sides of the conduit, as shown in Figs. 1, 2, 3. The top or cover C, at the ends of the sections thereof, has overlapping flanges C² and C³ where the different sections are united.

In practice the conduit A is placed with its outer surface on the curb-line and in the ground until the cover of the conduit is even with the sidewalk, the outer upper portion of the conduit forming above the gutter-level the curbstones. When the conduit is laid or placed in position in the street $A^3$, or across the same, the top or cover C of the conduit is arranged to be even with the top of the pavement of the street, so as to offer no obstruction whatever to the street in which the conduit may be placed. The electrical conductors R are placed in the spaces $F^2$ between the bars $F'$ of the grating or supporting-frame F, the same resting on and are supported by the cross-bars of the said frame or grating F. The conductors R can be taken from their respective spaces $F^2$ at any point down under the frame or grating, and from thence up through the tube E out under the sidewalk, through the said tube to the building at $A'$, or up through the post, as shown in Fig. 4, and through a continuation of the tube to the building, &c., above ground. The cables S are taken through the conduit and are placed in position on the brackets $B^2$, as shown in the figures. Provision is made for induction by cross-currents from the conductors $S'$ taken from the cables S down the side of the conduit across under the supporting frame or grating, and through spaces $F^3$, and from thence through the tube to the several places of destination, to be used for telegraphing, telephoning, or electric-lighting purposes, and may be taken under ground or above ground to their destination like conductors R, as before stated. The rubber packing strips H and $H'$ provide amply for expansion and contraction of the parts under the differences of temperature and render the joints water-tight where the sections of the conduit are united. The cover or top C is secured to the sides of the the conduit by means of the arms $C^8$, that engage lugs $C^9$, as shown in Fig. 2.

The arms $C^8$ are operated by means of a suitable key that fits on the top of the shaft $C^7$, by the use of which key the cover may be removed from the conduit at pleasure. The openings in the cover C, with outlets in the sides, afford ample ventilation for the conduit. When the conduit is placed in position in the street $A^3$, the cover C may be secured to the conduit by means of a clutch or by means of bolts, as desired.

It will be seen that by this my invention the objectionable features of underground conduits are removed. When the conduit is placed to the curb-line, as in Fig. 5, the street proper is not interfered with; neither is the sidewalk while work is being done in the conduit, making connections, &c., and when placed in the street, being even with the pavement, offers no obstructions thereto in the way of tearing up pavements, &c., when making repairs, connections, &c.

Having described my invention, I claim as new and desire to secure by Letters Patent—

In a conduit for electrical conductors, the combination, with the sides B, provided with arms or brackets $B^2$, and having flanges $B'$ $B^3$, secured by bolts G, and having elastic packing-strips H, of the top or cover C, having lugs $C'$, for securing the sides against lateral pressure, the elastic packing-strips $H'$, arranged between lugs $C'$, the cover having raised portions $C^{10}$ and flanges $C^2$ $C^3$, the shaft $C^7$, having arms $C^8$, to engage lugs $C^9$, the lugs $C^9$, to engage arms $C^8$, and the drips $C^4$, for covering openings in said cover C, substantially as described.

JAMES STEEL.

Witnesses:
GEORGE D. HOPPER, Jr.,
FRED I. WARNER.